US009081136B2

(12) United States Patent  
Lefevre et al.

(10) Patent No.: US 9,081,136 B2  
(45) Date of Patent: Jul. 14, 2015

(54) ATTENUATED PRIMARY REFLECTION INTEGRATED OPTICAL CIRCUIT

(71) Applicant: IXBLUE, Marly le Roi (FR)

(72) Inventors: Herve Lefevre, Paris (FR); Frederic Guattari, Aubervilliers (FR)

(73) Assignee: IXBLUE, Marly le Roi (FR)

( * ) Notice: Subject to any disclaimer, the term of this patent is extended or adjusted under 35 U.S.C. 154(b) by 208 days.

(21) Appl. No.: 13/759,290

(22) Filed: Feb. 5, 2013

(65) Prior Publication Data

US 2013/0202249 A1 Aug. 8, 2013

(30) Foreign Application Priority Data

Feb. 7, 2012 (FR) ...................................... 12 51135

(51) Int. Cl.
| | |
|---|---|
| *G02B 6/00* | (2006.01) |
| *G02B 6/26* | (2006.01) |
| *G02B 6/30* | (2006.01) |
| *G02B 6/12* | (2006.01) |
| *G02B 6/14* | (2006.01) |
| *G02B 6/122* | (2006.01) |
| *G02B 6/126* | (2006.01) |

(52) U.S. Cl.  
CPC ............ *G02B 6/12004* (2013.01); *G02B 6/122* (2013.01); *G02B 6/126* (2013.01); *G02B 6/14* (2013.01); *G02B 6/266* (2013.01); *G02B 6/30* (2013.01)

(58) Field of Classification Search  
CPC .............. G02B 6/14; G02B 6/27; G02B 6/30; G02B 6/122; G02B 6/126; G02B 6/266; G02B 6/12004  
USPC .................. 385/11, 14, 27, 29, 31, 38, 49, 50, 385/129–132, 140  
See application file for complete search history.

(56) References Cited

U.S. PATENT DOCUMENTS 4,372,642 A 2/1983 Singer et al.  
7,366,372 B2 * 4/2008 Lange .............................. 385/29

FOREIGN PATENT DOCUMENTS

| DE | 35 42 614 A1 | 6/1987 |
| DE | 10 2009 054 040 A1 | 5/2011 |
| EP | 0 893 713 A2 | 1/1999 |
| EP | 1 111 411 A2 | 6/2001 |
| EP | 1 111 412 A1 | 6/2001 |
| GB | 2 223 860 A | 4/1990 |
| JP | 59-019907 A | 2/1984 |

OTHER PUBLICATIONS

French Search Report, dated Sep. 13, 2012, from corresponding French application.

* cited by examiner

*Primary Examiner* — Akm Ullah  
*Assistant Examiner* — Michael Mooney  
(74) *Attorney, Agent, or Firm* — Young & Thompson

(57) ABSTRACT

An integrated optical circuit includes a substrate having an input face, an output face, a lower face and an upper face, at least one optical waveguide having a first waveguide end located on the input face of the substrate and a second waveguide end located on the output face of the substrate. The lower face of the substrate includes a first part that is planar and parallel to the upper face and an optical block, the optical block being positioned in the median plane and in the incidence plane, the optical block forming a protrusion at least at the primary reflection point of the integrated optical circuit with respect to the first planar part of the lower face and the optical block being capable of receiving and attenuating at least one non-guided optical beam propagating on the optical path of a primary reflection.

16 Claims, 5 Drawing Sheets

Fig. 9
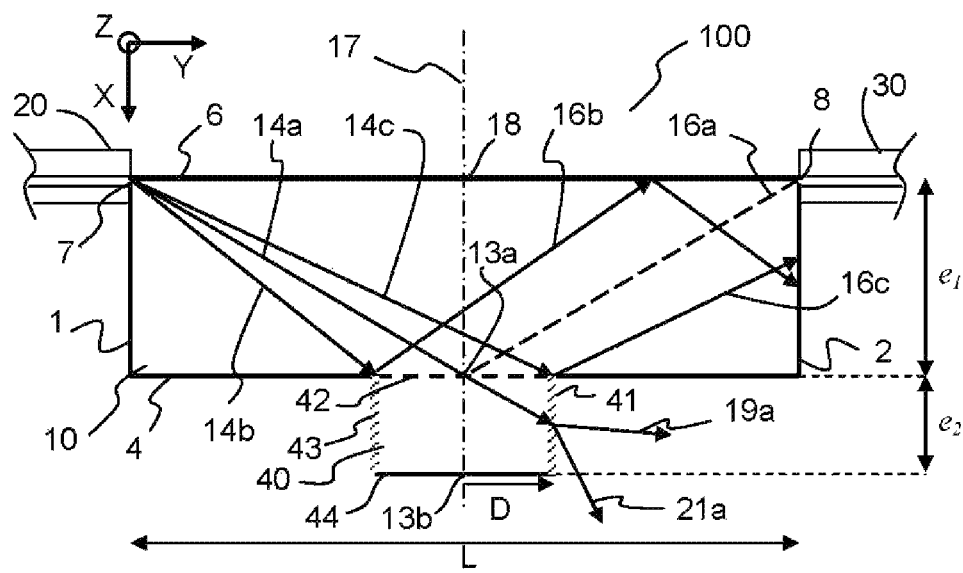
Fig. 10-A
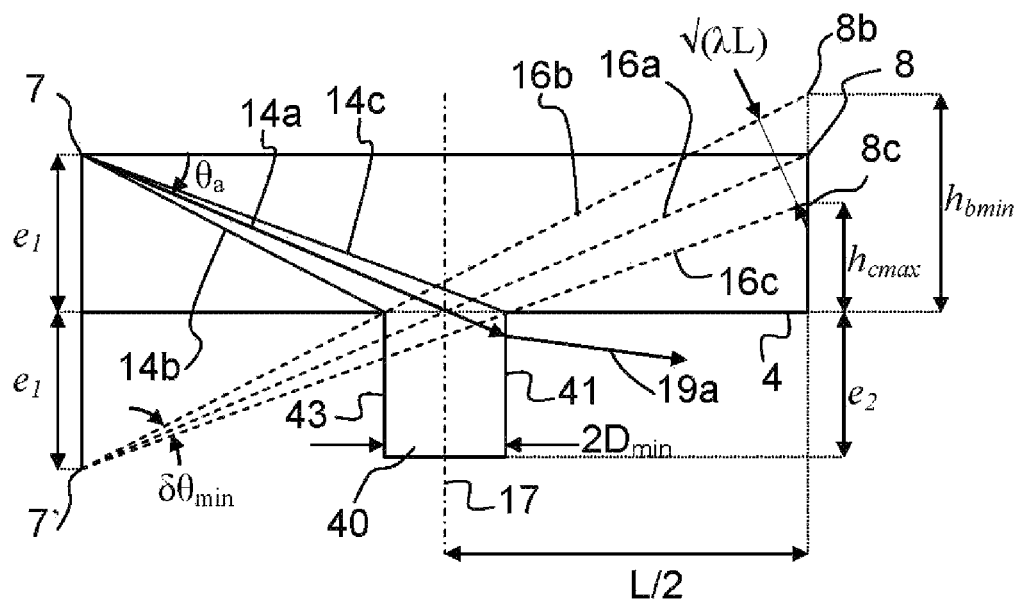

Fig. 10-B
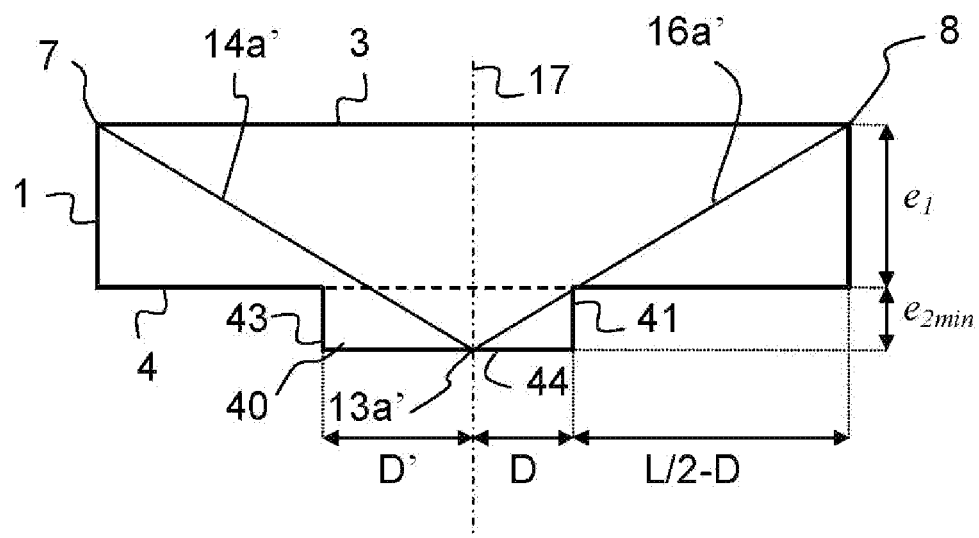
Fig. 11
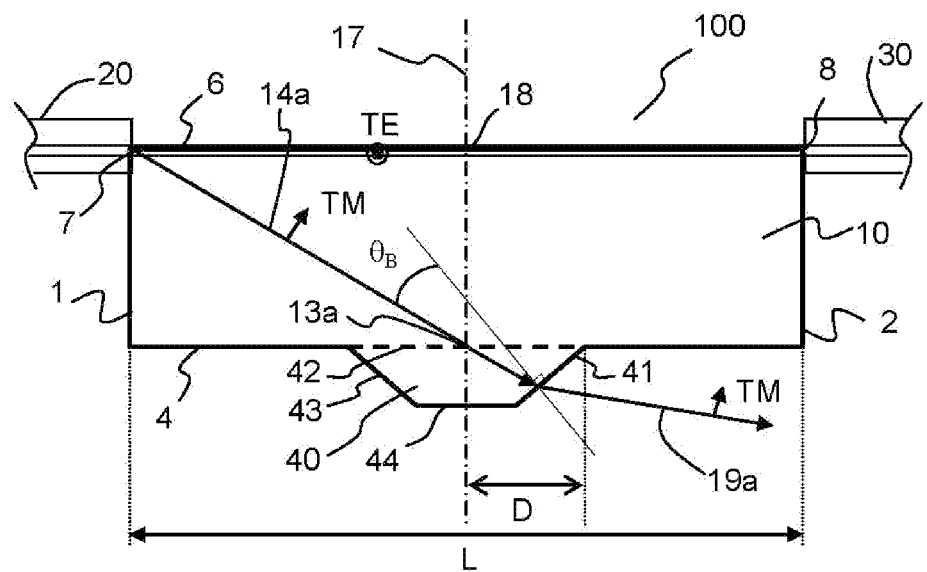

ATTENUATED PRIMARY REFLECTION INTEGRATED OPTICAL CIRCUIT

FIELD OF THE INVENTION

The present invention relates to an integrated optical circuit comprising a generally planar substrate and at least one optical waveguide. More precisely, the invention relates to an integrated optical circuit (IOC) comprising means for attenuating the propagation of spurious optical waves via the substrate.

BACKGROUND OF THE INVENTION

The making of integrated optical circuits is based on the use of microlithography techniques that allow mass production. A single-mode optical waveguide may be made on a planar substrate through steps of masking and deposition of a narrow strip of material, possibly followed by a step of thermal diffusion. In an integrated optical circuit, such as in an optical fiber, the effect of optical guiding is linked to a difference of refraction index between the optical waveguide and the substrate, the waveguide refraction index being higher than that of the substrate. Various materials may be used for the making of integrated optical circuits, such as III-V semiconductors, silica on silicon, glass or lithium niobate ($LiNbO_3$) or lithium tantalate ($LiTaO_3$). The lithium tantalate and the lithium niobate are particularly interesting materials because they have a Pockels electro-optic effect. By arranging electrodes on either side of the integrated waveguide, it is possible to modulate the waveguide index and thus to modulate the phase of an optical signal propagating in the waveguide. In an integrated optical circuit where the electrodes are separated by about ten microns, the application of a voltage of only a few volts is sufficient to generate an electric field and to induce the desired phase modulation. By comparison, in a conventional optical phase modulator, the electrodes being separated by at least one millimeter, the electric voltage required to generate a same electric field between the electrodes is of several hundreds of volts.

Various technologies of making lithium-niobate integrated optical circuits have been developed: first the titanium (Ti) diffusion technique, then the proton exchange technique. The titanium diffusion technique consists in depositing a titanium strip on the surface of a lithium niobate substrate, then heating the substrate so that the titanium diffuses into the substrate and locally increases the refraction index. The titanium diffusion technique requires a high temperature (900 to 1100° C.). The proton exchange technique consists in placing a birefringent $LiNbO_3$ crystal in an acid bath so as to replace Li+ ions by H+ ions (i.e. protons). The proton exchange technique is performed at a lower temperature than the titanium diffusion. Moreover, the technique of proton exchange on a birefringent $LiNbO_3$ crystal has for effect both to increase the extraordinary index of the crystal, which creates guidance for a polarization according to the extraordinary axis, and to reduce the ordinary index of the crystal, so that a polarization according to the ordinary axis is not guided. In the proton-exchange $LiNbO_3$ circuits, the usual configuration is an X-cut, the X axis of the single-axis birefringent $LiNbO_3$ crystal being perpendicular to the surface of the substrate, while the Y and Z axes of the crystal are parallel to the surface. The waveguide propagation axis is parallel to the Y direction, and the TE mode ("Transverse Electric" mode, i.e. the electric field is parallel to the surface of the substrate) is parallel to the Z direction. In this case, the proton-exchange optical waveguide guides only the TE polarization state, the TM cross-polarization state ("Transverse Magnetic" mode, i.e. the magnetic field is parallel to the surface of the substrate and thus the electric field is perpendicular to the surface of the substrate) propagating freely in the substrate. The lithium-niobate proton-exchange technique thus allows making a polarizer on integrated optical circuit.

Many integrated optical circuits are thus made from lithium niobate: polarizer, phase modulator, Mach-Zehnder interferometer, Y junction, 2×2 coupler or 3×3 coupler. Advantageously, a same optical circuit integrates several functions on a same substrate, which allows improving the compactness and reducing the optical connections. The lithium-niobate proton-exchange integrated optical circuits find applications in particular in the optical fiber gyroscopes.

In an integrated optical circuit, an input beam is generally coupled to an end of an optical waveguide through an optical fiber. However, only certain modes (for example, polarization mode) are guided by the waveguide, the other modes propagating freely in the substrate. Moreover, if the core of the fiber is not perfectly aligned with the waveguide of the integrated optical circuit, a part of the incident light beam may be coupled in the substrate and propagate outside the waveguide. A part of the light that is not guided by the waveguide may be reflected by total internal reflection on one or several faces of the substrate. In fine, a part of this non-guided light may be coupled to an output optical fiber facing another end of the waveguide. The non-guided light may thus disturb the operation of an integrated optical circuit. For example, in the case of a lithium-niobate proton-exchange polarizer, the polarization rejection rate may be affected by the coupling of light transmitted in a non-guided way by the substrate. Likewise, in the case of a 2×2 or 3×3 coupler, the non-guided light may be coupled via the substrate from an input to an output of the integrated optical circuit.

FIG. 1 schematically shows a perspective view of an integrated optical circuit according to the prior art. The integrated optical circuit comprises a planar substrate 10. By convention in the present description, the substrate 10 comprises an input face 1, an output face 2, a lower face 4, an upper face 3 and two side faces 5. The lower face 4 and the upper face 3 extend between the input face 1 and the output face 2. The lower face 4 and the upper face 3 are opposite to each other. Preferably, the lower face 4 and the upper face 3 are planar and parallel to each other. Likewise, the side faces 5 are planar and parallel to each other and extend between the input face 1 and the output face 2. The input face 1 and the output face 2 of the substrate may also be planar and polished, but they are preferably cut with an inclination angle so as to avoid the spurious back-reflections at the ends of the waveguide. The substrate 10 comprises a rectilinear optical waveguide 6 that extends between a first end 7 on the input face 1 and a second end 8 on the output face 2. By convention, the waveguide 6 is nearer the upper face 3 than the lower face 4. In the case of a lithium-niobate proton-exchange polarizer, the optical waveguide 6 is located below the upper face 3 of the substrate and extends in a plane parallel to the upper face 3. The optical waveguide 6 may be delimited by the upper face or be buried just below this upper face. In other types of IOC, the waveguide 6 may be deposited on the upper surface 3 or may extend inside the substrate, for example in an plane parallel to the upper face 3, half the way between the lower face 4 and the upper face 3. An input optical fiber 20 and an output optical fiber 30 are optically coupled to the first end 7 and the second end 8, respectively, of the waveguide 6. The input optical fiber 20 transmits an optical beam in the integrated optical circuit. A part of the optical beam is guided by the waveguide. The guided beam 12 propagates up to the end 8 of the waveguide 6 facing the output fiber 30. Due to a mode mismatch between the core of the optical fiber 20 and the integrated waveguide 6, another part of the beam is not coupled in the waveguide and propagates freely in the substrate 10. A non-guided beam 14 then propagates in the substrate, down to the lower face 4 of the substrate. A part of the non-guided beam 14 may be reflected by total internal reflection on the lower face 4. A part of the reflected beam 16 may then be transmitted up to the end of the substrate facing the output fiber 30. The output fiber 30 may thus collect not only the guided optical beam 12, but also a part of the non-guided and reflected optical beam 16. FIG. 1 shows only a single reflection on the lower face 4 of the substrate, half the way between the input face 1 and the output face 2, i.e. at the center of the lower face 4. Other multiple internal reflections are also possible.

FIG. 2 shows a sectional view of the integrated optical circuit of FIG. 1, on which is schematically shown the angular distribution of the light power P of the non-guided optical beam in the substrate. The plane of FIG. 2 is defined as being an incidence plane passing through the first end 7 and the second end 8 and perpendicular to the lower face 4. It is observed that a rather high part of the optical beam is optically coupled in the substrate. The non-guided optical wave undergoes a total internal reflection on the upper surface 3. Therefore, the non-guided optical wave is subjected to an interferometric effect of the Lloyd-mirror type on the upper face 3 of the substrate. This results in a Lloyd-mirror interferometer, with interferences occurring between the input fiber 20 and its virtual image. Further, the total internal reflection produces a phase-shift of π. Accordingly, the central fringe of the interferogram, located on the upper face 3, is a black fringe. This explains that the density of power of the non-guided light propagating directly is drastically reduced just below the upper face 3, where the output optical fiber is placed (cf. H. Lefèvre, The fiber optic gyroscope, Artech House, 1992, Annex 3 Basics of Integrated Optics, pp. 273-284). Consequently, a proton-exchange polarizer should have in theory a very high polarization rate of −80 to −90 dB.

However, there exist other couplings of the non-guided optical beam than the direct transmission. Indeed, the substrate may transmit various non-guided beams propagating by internal reflection, in particular on the lower face 4, but also on the upper face 3 or on the side faces 5. Non-guided spurious beams propagating by internal reflection on the faces of the substrate may arrive near a waveguide end 8 on the output face 2 of the substrate.

Generally, the non-guided beams reflected inside the substrate may affect the quality of the signals transmitted in the waveguide of an integrated optical circuit. In the case of a lithium-niobate proton-exchange polarizer, cut following an X plane and comprising an integrated waveguide according to the propagation axis, Y, the guided beam 12 is generally a TE polarization beam and the non-guided beam 14 is a TM polarization beam. Due to the internal reflections of non-guided light in the substrate, the polarization rejection rate of a proton-exchange polarizer according to the schema of FIG. 1 is in practice limited to about −50 dB. Further, the quality of an integrated polarizer influences the performance of certain applications, in particular in an optical fiber gyroscope. It is therefore necessary to improve the rejection rate of an integrated-waveguide polarizer. More generally, it is desirable to improve the optical quality of an integrated optical circuit and to reduce the quantity of non-guided spurious light transmitted by the substrate outside the optical waveguide.

Various solutions have been proposed to solve the problem of spurious coupling of non-guided optical beams between a waveguide input and a waveguide output in an integrated optical circuit.

It is generally admitted that the main contribution to the spurious light comes from the primary reflection of a non-guided beam 14a at a primary reflection point 13a located at the center of the lower face 4 between a first waveguide end 7 on the input face 1 and a second waveguide end 8 on the output face 2. In order to suppress the primary reflection on the lower face of a substrate 4, an integrated optical circuit has been developed, comprising a central groove 25a arranged at the middle of the lower face 4 (cf. the perspective view of FIG. 3 and the top view of FIG. 4). In FIG. 4 is shown the layout of a median plane 17, which is defined as being a plane perpendicular to the lower face 4, perpendicular to a line segment joining the first and the second waveguide ends and which passes through the middle of this line segment. A middle point 18 is defined, which is located at the middle of the line segment joining the first end 7 and the second end 8 of the waveguide 6. The central groove 25a extends over the whole width of the substrate according to a direction perpendicular to the direction of the waveguide 6. However, if a central groove 25a stops the non-guided beam 14a reflecting at the center of the lower face 4 of the substrate, it does not stop the multiple internal reflections occurring between the lower face 4 and the upper face 3. FIG. 5 shows an example of a part of a non-guided optical beam 14b propagating between a first waveguide end 7 and a second waveguide end 8, through double reflection on the lower face and simple reflection on the upper face to form a multiple reflection spurious beam 16b. Therefore, a central groove on the lower face of the substrate allows improving the rejection rate of a proton-exchange polarizer by several orders of magnitude, but the rejection rate remains limited in practice to about −65 dB.

In the case of a Y junction, the U.S. Pat. No. 7,366,372 proposes to arrange a first central groove 25a on the lower face of the integrated optical circuit, half the way between the input face 1 and the output face 2, so as to suppress the primary reflection, and a second central groove 25b on the upper face, arranged between the legs of the Y junction, and half the way between the input face and the output face, so as to suppress the part of the non-guided beam 14b propagating by multiple reflection in the substrate and reflecting on the middle of the upper face (see the sectional view of FIG. 6). However, the central groove 25b on the upper face 3 must not cut the waveguide 6 and is thus limited laterally so as not to cut the legs of the Y junction. This solution is not generalizable to other types of optical integrated circuits.

The U.S. Pat. No. 5,321,779 describes an IOC comprising at least one central groove, extending in the median plane, half the way between the input face and the output face of the IOC, and possibly two side grooves arranged at ¼ and ¾ of the length of the substrate, respectively. According to this document, the effect of the central groove is to attenuate the primary reflection at the central point. As a complement, the effect of the side grooves at ¼ and ¾ of the length is to attenuate multiple reflections between the lower face and the upper face. The grooves at ¼ and ¾ do not affect the primary reflection. However, it is experimentally observed that the presence of side grooves at ¼ and ¾ of the substrate length, on either side of a central groove, reduces only marginally the recoupling of the non-guided spurious light, compared to an IOC having only one central groove.

SUMMARY OF THE INVENTION

The invention aims to propose an alternative solution to the formation of an absorbing central groove on the lower face of an optical integrated circuit. More precisely, one object of the invention is to propose an integrated optical circuit that is robust and that allows reducing the rate of transmission of non-guided spurious light in the substrate between an input optical fiber and an output optical fiber. This invention also applies in the case where several IOCs having several input optical fibers and/or several output optical fibers are arranged parallel to each other on a same substrate.

The present invention aims to remedy the drawbacks of the prior arts and relates, more particularly, to an integrated optical circuit comprising a substrate, said substrate including an input face, an output face, a lower face, an upper face and two side faces, said lower face, upper face and side faces extending between the input face and the output face, the upper face being planar and opposite to the lower face; at least one optical waveguide located in a plane parallel to the upper face, said at least one optical waveguide extending between said input face and said output face; at least one first waveguide end located on the input face of the substrate and at least one second waveguide end located on the output face of the substrate; said integrated optical circuit being capable of receiving an incident optical beam on said first waveguide end, of forming a guided optical beam propagating in an optically guided manner, and of forming a non-guided optical beam propagating in a non-guided manner in the substrate.

There are defined a median plane perpendicular to the upper face and to a line segment joining the first and the second waveguide ends, said median plane passing through the middle of said line segment, an incidence plane perpendicular to the median plane, said incidence plane passing through the first and the second ends, and a primary reflection point located on the lower face at the intersection of the median plane and the incidence plane.

According to the invention, the integrated optical circuit includes an optical block extending from the lower face to the outside of the substrate, arranged in the form of a part added on the lower face of the substrate, said optical block being positioned in the median plane and in the incidence plane and being in contact with said substrate at said primary reflection point and on a surface surrounding said primary reflection point, the lower face of the substrate comprising a first part that is planar and parallel to the upper face, said optical block forming a protrusion, at least at the primary reflection point, with respect to said first planar part of the lower face, and said optical block being capable of receiving and attenuating at least one non-guided optical beam propagating on the optical path of a primary reflection on said primary reflection point between said first waveguide end and said second waveguide end.

According to particular aspects of the invention:
said optical block is in optical contact with the lower face of said substrate over a surface surrounding said primary reflection point;
said optical block is formed of a material whose refraction index is higher than or equal to 95% of the refraction index of the substrate;
said optical block is formed of a same material as the substrate;
the substrate being formed of an oriented birefringent material, said optical block is arranged on the lower face of the substrate following the same birefringence orientation as the substrate.

According to a variant of the invention:
said optical block comprises at least one first facet arranged between the output face and said median plane, said at least one first facet being capable of receiving at least one non-guided optical beam propagating from the first end to said primary reflection point and/or at least one primary-reflection non-guided optical beam propagating from said primary reflection point to the second end, so as to attenuate said primary-reflection non-guided optical beam.

According to various aspects of the invention:
said substrate has a thickness $e_1$ between the planar part of the lower face and the upper face, said substrate has a length L between said input face and output face and said at least one first facet is located at a distance D from said median plane that is higher than or equal to a minimum distance $D_{min}$, where $D_{min}$ is defined by the following equation:

$$D_{min} = \frac{L^2 \times \sqrt{\lambda/L}}{8 \times e_1}.$$

the optical block has a depth $e_2$ higher than or equal to a minimum depth $e_{2min}$, such that:

$$e_{2min} = e_1 \times \frac{D}{(L/2 - D)}.$$

According to other aspects of the invention:
said optical block includes at least one second facet arranged between the input face and said median plane, said at least one second facet being capable of receiving at least one non-guided optical beam propagating from the first end to a primary reflection point so as to attenuate said primary-reflection non-guided optical beam;
said at least one first facet forms an angle equal to the Brewster angle with said at least one non-guided optical beam propagating from the first waveguide end to said primary reflection point;
said optical block extends according to a direction parallel to the median plane;
said planar substrate is a lithium niobate crystal, said at least one waveguide is a polarizer waveguide formed by proton exchange, said guided optical beam being of electric transverse polarization and said non-guided optical beam being of magnetic transverse polarization and wherein said optical block is formed of a lithium niobate crystal arranged with an orientation of the birefringence axes similar to that of said planar substrate.

The invention will find a particularly advantageous application in an integrated circuit of the proton-exchange polarizer type.

The present invention also relates to the characteristics that will become evident from the following description and that will have to be considered either alone or in any technically possible combination thereof.

BRIEF DESCRIPTION OF THE DRAWINGS

The invention will be better understood and other objects, details, characteristics and advantages of the latter will appear more clearly from the description of one or more particular embodiments of the invention, given only by way of illustrative and non-limitative example, with reference to the appended drawings. In these drawings:

FIG. 9 schematically shows a sectional view of an integrated optical circuit according the one embodiment of the invention;

FIG. 10-A illustrates a first condition about the width D of the optical block and FIG. 10-B illustrates a second condition about the depth $e_2$ of the optical block;

FIG. 11 schematically shows a sectional view of an integrated IOC according to a variant of the invention.

DETAILED DESCRIPTION OF THE INVENTION

Figure 1:
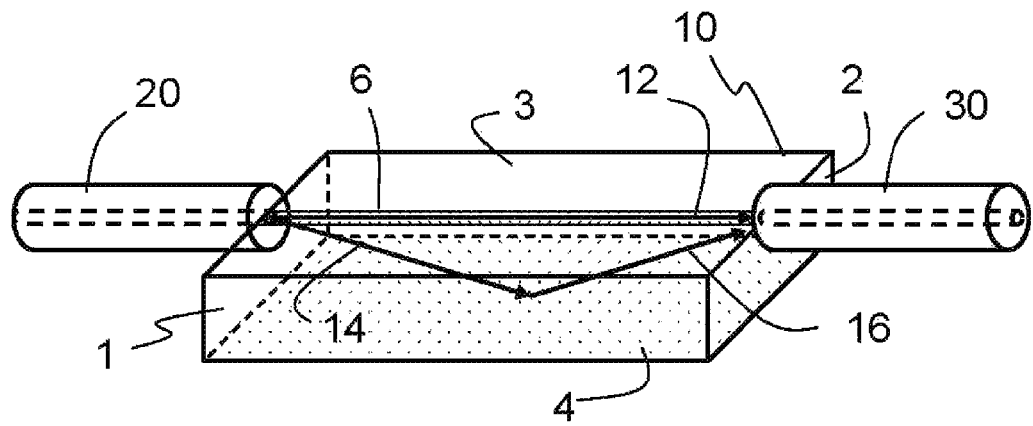
FIG. 1 schematically shows a perspective view of an integrated optical circuit according to the prior art.
Figure 2:
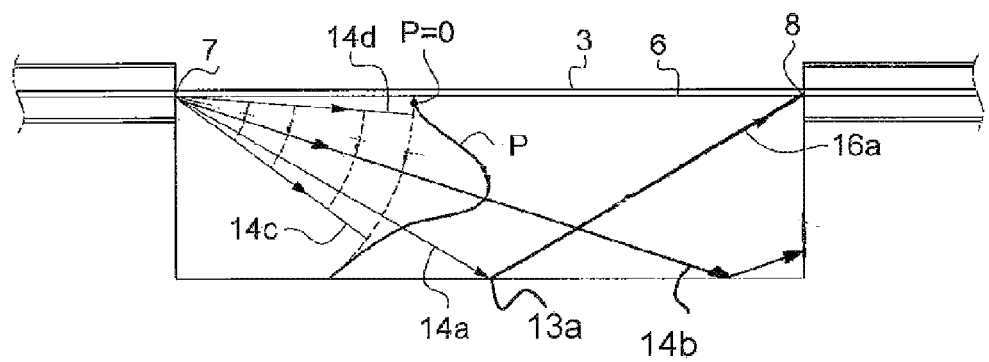
FIG. 2 schematically shows the angular distribution of the light power P of a non-guided optical beam in an integrated optical circuit such as that of FIG. 1, in sectional view.
Figure 3:
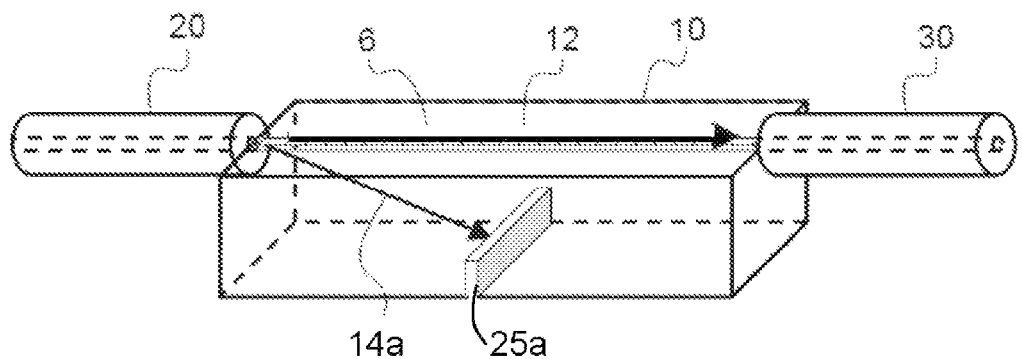
FIG. 3 schematically shows a perspective view of an integrated optical circuit comprising a central groove according to the prior art.
Figure 4:
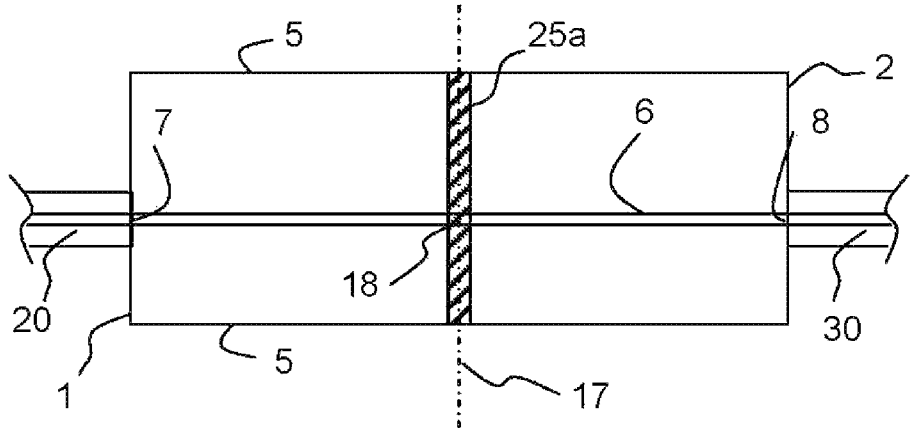
FIG. 4 schematically shows a top view of an integrated optical circuit with a central groove according to the prior art.
Figure 5:
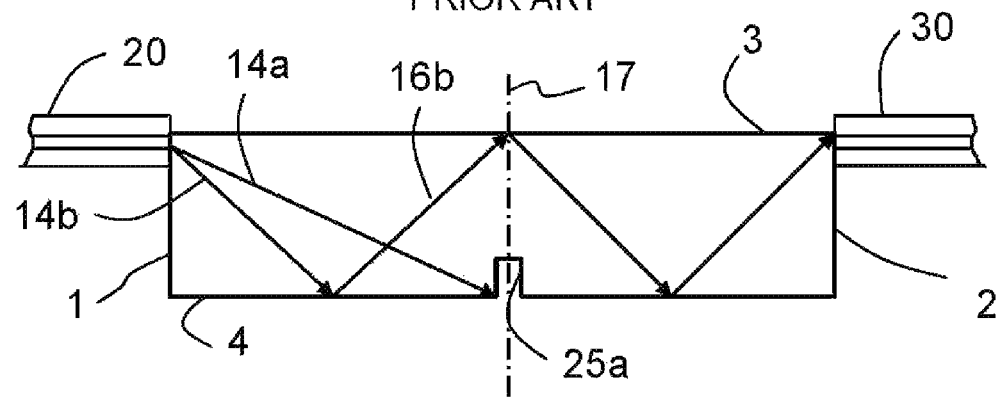
FIG. 5 schematically shows the propagation of a non-guided optical beam in an IOC with a central groove according to the prior art.
Figure 6:
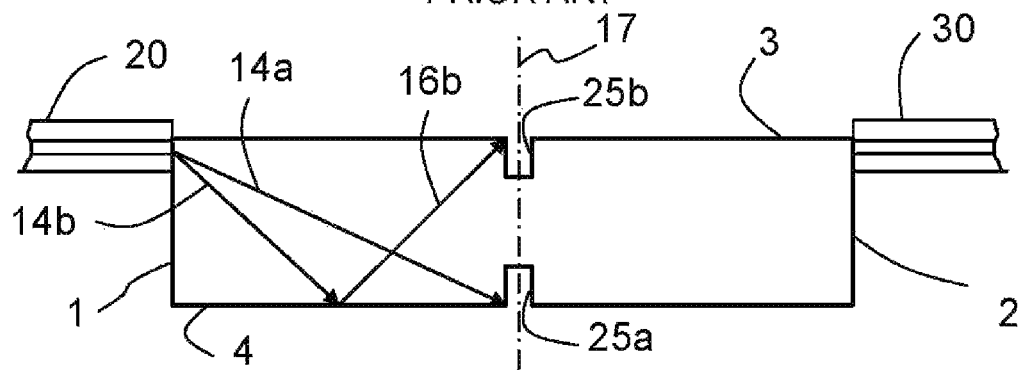
FIG. 6 schematically shows a sectional view of a Y junction comprising a groove on the lower face and a groove on the upper face according to the prior art.
Figure 7:
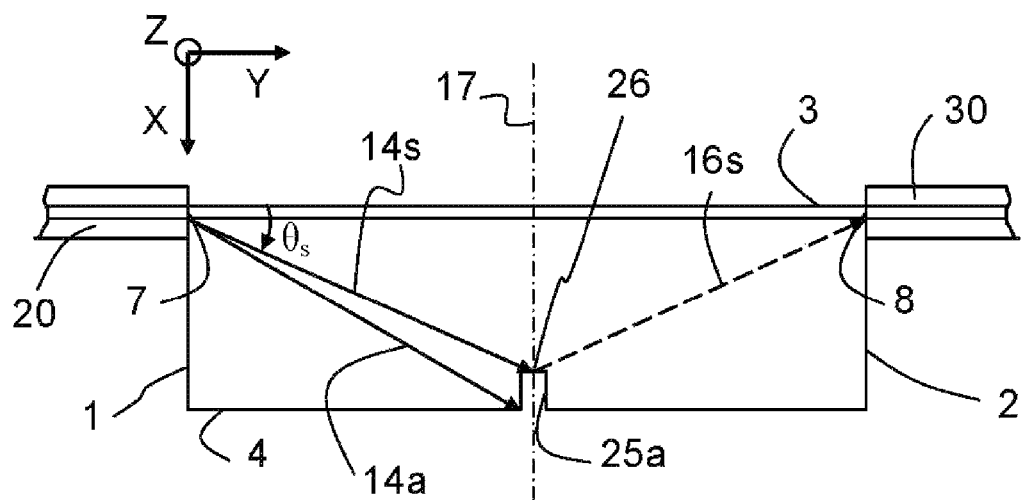
FIG. 7 schematically shows a sectional view of an integrated optical circuit comprising a central groove on the lower face and a specular-reflection spurious beam on the bottom of the central groove.

An observation that is part of the present invention is that, in an integrated circuit comprising a central groove 25a, such as shown in FIGS. 3 to 6, a residual fraction of spurious light may nevertheless be optically coupled between a first waveguide end 7 on the input face 1 and a second waveguide end 8 on the output face 2. FIG. 7 shows a sectional view of an integrated optical circuit with a central groove. The integrated optical circuit comprises a substrate, having an input face 1, an output face 2, a lower face 4 and an upper face 3. The lower face 4 and the upper face 3 are planar and parallel to each other. The substrate also includes two side faces 5 parallel to the plane of the figure. In FIG. 7, the integrated optical circuit also includes an optical waveguide 6 having a first end 7 on the input face 1 and a second end 8 on the output face 2. In the following of the description, it is supposed that the ends 7 and 8 are located almost in the plane of the upper face 3. The plane of FIG. 7 is a plane passing through the two waveguide ends 7 and 8 and perpendicular to the lower face 3 and/or upper face 4. A median plane 17 is defined, which is perpendicular to the lower face 4 and which passes through the middle of a line segment joining the first end 7 and the second end 8. In other words, the median plane 17 is located half the way between the input face 1 and the output face 2. The median plane 17 is perpendicular to the plane of FIG. 7. The layout of the median plane 17 is represented in FIG. 7 by a dash-point line. The XYZ system represents a Cartesian coordinate system: the Y axis extends in the plane of the upper face 3, parallel to the line segment joining the first end 7 and the second end 8; the X axis is perpendicular to the Y axis and parallel to the incidence plane; and the Z axis is perpendicular to the incidence plane. In the case of a proton-exchange IOC, this XYZ system corresponds to the crystal axes of the lithium niobate.

Figure 8:
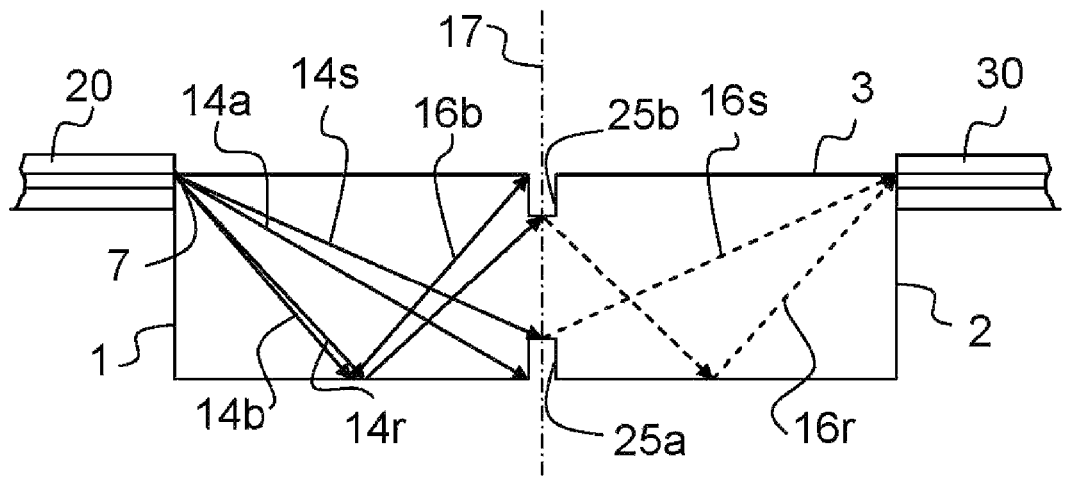
FIG. 8 schematically shows a sectional view of an integrated optical circuit comprising a central groove on the lower face, a central groove on the upper face and a specular-reflection spurious beams on the bottoms of the two central grooves.

In FIG. 7, the integrated optical circuit includes a central groove 25a extending in the median plane 17 from the lower face 4 to the inside of the substrate. The central groove 25a is generally made by means of a saw and has a bottom 26. The central groove 25a is commonly filled with an optically absorbing material. An observation that is part of the present invention is that, in an integrated circuit comprising a central groove 25a, such as shown in FIGS. 3 to 6, a residual fraction of spurious light may nevertheless be optically coupled between a first waveguide end 7 on the input face 1 and a second waveguide end 8 on the output face 2. Indeed, a part of the non-guided light beam 14s may form a spurious beam 16s by specular reflection on the bottom 26 of the central groove 25a (cf. FIG. 7). A part of the non-guided beam 14s may be specularly reflected on the bottom 26 of a central groove 25a, i.e. the upper facet 26, even when this groove is clear-polished or filled with an absorbing material. The central groove 25 being arranged in the median plane 17, the bottom 26 of the central groove 25 is also in the median plane 17. Likewise, in the case of a Y junction comprising a central groove 25a on the lower face 4 and a central groove 25b on the upper face 3, another part of the non-guided light beam 14r may also form a specular-reflection spurious beam 16r on the bottom of the central groove 25b on the upper face of the substrate towards the output face of the integrated optical circuit (cf. FIG. 8). Due to the symmetry of the device with respect to the central groove, the angle of the specular reflection on the bottom of the central groove produces a reflected beam 16s and/or 16r, which is directed towards the second end 8 of the waveguide 6. By symmetry, the beams 16s and 16r are then coupled in the core of the output optical fiber 30. There results from the present analysis that the contribution of the spurious light by specular reflection on the bottom of a groove is by no means negligible.

Another aspect of the analysis of operation of an IOC with a central groove relates to the relative power of the non-guided beams 14a and 14s of FIG. 7. A central groove 25a contributes to locally moving the reflecting surface of the lower face closer towards an area where the power of the non-guided optical beam is higher. Moreover, the grazing incidence angle $\theta_S$ on the bottom of a central groove is lower than the incidence angle of the primary reflection beam 14a on the center of the lower face. All these elements demonstrate that the presence of a central groove 25a does not make it possible to fully eliminate the spurious light propagating via the substrate between the first and the second waveguide ends.

FIG. 9 shows a sectional view of an integrated optical circuit according to the invention. The integrated optical circuit comprises a substrate having an input face 1, an output face 2, a lower face 4 and an upper face 3. The upper face 3 is planar, and a part of the lower face 4, which extends from the output face 2, is planar and parallel to the upper face 3. The substrate also includes two side faces parallel to the plane of the figure. In FIG. 9, the integrated optical circuit also includes an optical waveguide 6 having a first end 7 on the input face 1 and a second end 8 on the output face 2. A middle point 18 is defined, which is located at the middle of the line segment joining the first end 7 and the second end 8 of the waveguide 6. A median plane 17 is also defined, which is perpendicular to the line segment joining the first end 7 and the second end 8 and passing through the middle point 18. The median plane 17 is located at the same distance from the first end 7 and the second end 8 of the waveguide 6. The median plane is perpendicular to the plane of FIG. 9. The layout of the median plane 17 is represented in FIG. 9 by a dash-point line. A primary reflection point 13a is defined, which is located at the center of the lower face 4 of the substrate when the lower face 4 is planar and parallel to the upper face 3. The primary reflection point 13a is located at the intersection of the incidence plane and the median plane. By definition, the middle point 18 and the primary reflection point 13a are located in the median plane 17.

The integrated optical circuit 100 also includes an added-on optical block 40 extending from the planar part of the lower face 4 of the substrate 10. The optical block 40 is arranged on the lower face, at the intersection of the median plane 17 and the incidence plane. The optical block 40 comprises a first side facet 41 and a second side facet 43. Advantageously, the optical block 40 is in optical contact with the lower face 4 of the substrate 10, at least at the primary reflection point 13a and advantageously all around the primary reflection point 13a. The optical block 40 forms a protrusion around the primary reflection point 13a. The optical block 40 comes from a part added on the substrate 10. Advantageously, the optical block 40 is a block of the same material than the remaining of the substrate 10. In this case, the interface 42 between the lower face of the substrate and the optical block 40 is the area of optical contact between the optical block 40 and the lower face 4 of the substrate 10. Advantageously, in this case, the optical block 40 is fixed to the substrate 10 by optical adherence. Still advantageously, the optical block 40 has the same refraction index as the substrate 10. In the case where the substrate 10 is formed of a birefringent material, the optical block 40 is preferably formed of the same birefringent material, the optical axes of the optical block 40 being oriented in the same manner as the optical axes of the birefringent substrate 10. The optical block 40 includes at least one first facet 41 rising from the lower face 4 of the substrate. The first facet 41 is located between the median plane 17 and the output face 2. In FIG. 9, the optical block 40 also includes a second facet 43 rising from the lower face 4 of the substrate. The second facet 43 is located between the median plane 17 and the input face 1. Advantageously, the first facet 41 extends in a plane perpendicular to the incidence plane and the second facet 43 extends in another plane perpendicular to the incidence plane. As an alternative, the first facet 41 and the second facet 43 extend in planes parallel to the input face 1 and output face 2.

In FIG. 9 is shown an integrated optical circuit in which the optical block 40 is formed in a material similar to that of the substrate 10, the optical block 40 being in optical contact with the lower face 4 of the substrate 10. In FIG. 9, the optical block 40 also includes a first facet 41 rising from the lower face 4. According to this embodiment, the first facet 41 forms an angle of about 90 degrees with the planar part of the lower face 4. The distance between the facet 41 and the median plane 17 is denoted D.

The optical waveguide 6 receives on its first end 7 an incident optical beam 11 coming from an input optical fiber 20. A part of the incident optical beam 11 propagates in a guided manner in the waveguide 6 and forms a guided beam 12 propagating towards the second end 8. Another part of the incident beam 11 propagates in the integrated optical circuit in a non-guided manner, and forms a non-guided optical beam 14. For example, in the case of an integrated optical circuit of the proton-exchange polarizer type, the guided optical beam 12 is polarized according to a first polarization mode (for example, the TE mode) and the non-guided optical beam 14 is polarized according to a second polarization mode (for example, the TM mode). Due to the divergence of the non-guided optical beam, the non-guided optical beam may propagate along various optical paths, corresponding to different parts 14a, 14b, 14c of the non-guided optical beam 14.

The non-guided beam 14a shows a non-guided optical beam going from the first end 7 of the waveguide 6 to the primary reflection point 13a located at the center of the lower face 4. In the absence of optical block 40, the non-guided optical beam 14a would form, by reflection on the lower face 4 at the primary reflection point 13a, a primary reflection beam 16a towards the second end 8 of the waveguide 6. This primary reflection beam 16a is liable to be optically coupled in an output optical fiber 30 intended to receive the guided optical beam 12. The primary reflection beam 16a is an important cause of disturbance of the output signal of the integrated optical circuit.

In the presence of the optical block 40 formed in the same material as the substrate 10 and in optical contact with the substrate 10, the non-guided optical beam 14a undergoes neither reflection nor refraction at the primary reflection point 13a on the interface 42. Therefore, the non-guided beam 14a is not deviated by the interface 42. That way, the non-guided optical beam 14a propagates in the optical block 40 until being incident on the first facet 41 of the optical block 40. By refraction on the first facet 41, the non-guided optical beam 14a forms a beam 19a refracted outside the integrated optical circuit. A to spurious reflection of the non-guided beam 14a may possibly occur on the first facet 41, but this spurious reflection is not directed towards the second end of the waveguide. Advantageously, the surface of the first facet 41 is clear-polished to diffuse the light. In this case, a part of the non-guided beam 14a forms a diffused beam 21a propagating outside the IOC.

The thickness of the substrate 15 between the upper face 3 and the lower face 4 is defined as $e_1$, and the thickness of the optical block 40 is defined as $e_2$. The length of the substrate taken between the input face 1 and the output face 2 is defined as L and the distance between the median plane 17 and the first side facet 41 of the optical block 40 is defined as D. It is observed in FIG. 9 that a non-guided beam 14c incident on the edge formed by the intersection between the side facet 43 of the optical block 40 and the lower face 4 of the substrate forms, by internal reflection on the lower face 4, a reflected non-guided beam 16c, which is offset with respect to the second end 8 of the waveguide. Likewise, a non-guided beam 14b incident on the edge formed by the intersection between the side facet 41 of the optical block and lower face 4 of the substrate forms, by internal reflection on the lower face 4, a reflected non-guided beam 16b, which is offset with respect to the second end 8 of the waveguide. The optical block 40 thus forms an angle sector of shadow that suppresses the spurious reflection around the central point 13a of the lower face of the substrate.

To be efficient, the optical block must fulfill certain geometrical conditions, which are detailed with reference to FIGS. 10-A and 10-B. FIG. 10-A allows explaining a first condition about the width D of the optical block and FIG. 10-B allows explaining a second condition about the depth $e_2$ of the optical block.

In FIG. 10-A is shown an optical block 40, which is symmetrical with respect to the median plane 17 and whose width is equal to 2×D in the direction of the length L of the substrate. The paths of the above-described optical beams 14a, 14b and 14c are shown. The point 7' corresponds to the image of the first waveguide end 7 by mirror effect on the lower face 4 of the substrate. The paths of the reflection beams 14a, 14b and 14c thus come from the image point 7'. The path of a reflection beam 16a that would occur in the absence of the optical block 40 passes through the image point 7', through the central point of the lower face 3 and through the second waveguide end 8. The path of the reflection beam 16c passes through the image point 7', through the edge of the optical block 40 at the intersection of the side facet 41 and the lower face 4 and reaches a virtual point 8c in the plane of the output face 2. The path of the reflection beam 16b passes through the image point 7', through the edge of the optical block 40 at the intersection of the side facet 43 and the lower face 4 and reaches a virtual point 8b in the plane of the output face 2.

The reflected non-guided beams 16b and 16c are incident on the output face 2 at a non-zero distance from the second waveguide end 8. Therefore, the optical block 40 forms an angle sector of shadow for the primary reflection around the primary reflection point 13a. Due to the diffraction on the edges of the optical block 40, referred to the screen-edge Fresnel diffraction, the angle sector of shadow, delimited by the lines 16b and 16c has an inner penumbra of width equal to $$\sqrt{\frac{\lambda x}{2}}$$

on each side, and thus of $$2 \times \sqrt{\frac{\lambda x}{2}}$$

in double penumbra, where x is the distance between the considered edge and the output face 2 and λ is the wavelength of the non-guided optical beam in the material. By making the approximation x≈L/2, the width of the double penumbra is therefore:

$$\approx 2\sqrt{\frac{\lambda L}{4}} = \sqrt{\lambda L}.$$

In order for the second waveguide end 8 to remain outside the area of double penumbra, the point 8b must be at a minimum height $h_{bmin}$ with respect to the lower face 4 and the point 8c must be at a maximum height $h_{cmax}$ with respect to the lower face 4, so that:

$$h_{bmin} - h_{cmax} \approx \sqrt{\lambda L}.$$

In an exemplary embodiment, the length L is equal to 40 mm, the substrate thickness $e_1$ is equal to 1 mm, and the wavelength in the material is equal to 0.7 μm, hence $h_{bmin} - h_{cmax} \approx 170$ μm.

The angle $\delta\theta_{min}$ is defined, which is the apex angle of the shadow area formed by the optical block. The following is verified:

$$h_{bmin} - h_{cmax} \approx L \times \delta\theta_{min}$$

hence:

$$\delta\theta_{min} = \sqrt{\lambda/L}.$$

The above equation is translated on a minimum width $D_{min}$ of the optical block 40, defined as follows:

$$\delta\theta_{min} = \frac{2 D_{min} \times \theta_a}{L/2}.$$

where $\theta_a$ represents the angle formed between the upper face 3 and the non-guided optical beam 14a, $\theta_a$ being defined by:

$$\theta_a = \frac{e_1}{L/2}.$$

As a result:

$$\delta\theta_{min} = \frac{8 D_{min} \times e_1}{L^2} \approx \sqrt{\lambda L},$$

hence:

$$D_{min} = \frac{L^2 \times \sqrt{\lambda/L}}{8 \times e_1}.$$

In the exemplary embodiment where L is equal to 40 mm, $e_1$ is equal to 1 mm and λ is equal to 0.7 μm, the resulting minimum width for the optical block 40 is $D_{min} \approx 840$ μm.

FIG. 10-B allows explaining a second condition about the depth $e_2$ of the optical block. In FIG. 10-B is shown an optical block 40 having a side facet 41 at a distance D from the median plane 17 and a side facet 43 at a distance D' from the median plane 17. The smallest of the distances D and D' must verify the condition explained with reference to FIG. 10-A and must be higher than the distance $D_{min}$ defined above. In the case of FIG. 10-B, D is lower than D'. In FIG. 10-B is shown the path of an optical beam 14a' that is reflected at the center of the lower face 44 of the optical block 40 and forms a reflection beam 16a'. In FIG. 10-B, the reflected beam 16a' is just tangent to the edge of the block 40 formed by the intersection between the side facet 41 and the lower face 4 of the substrate. In order to avoid the reflected beam 16a' to be directed directly towards the second waveguide end, the optic block must have a depth $e_2$ higher than a minimum depth $e_{2min}$, such that:

$$e_{2min} = e_1 \times \frac{D}{(L/2 - D)}.$$

In practice, it is chosen $e_2 \geq 2 \times e_{2min}$.

In an exemplary embodiment, where $e_1$ is equal to 1 mm and L/2 is equal to 20 mm, D is chosen equal to 1.5 mm and, as a result, $e_{2min} = 80$ μm, which does not pose any difficulty. In practice, an optical block having a width of 3 mm and a thickness of 300 μm or 500 μm is suitable for attenuating the non-guided spurious beams.

The integrated optical circuit may be used in the two directions of propagation of the optical signals. Advantageously, the optical block 40 includes a second facet 43, the second facet 43 being arranged between the input face and the median plane 17. For example, the second facet 43 is arranged symmetrically to the first facet 41 with respect to the median plane. In the exemplary embodiment of FIG. 9, the first facet 41 and/or the second facet 43 are perpendicular to the plane of the figure. The second facet 43 allows, symmetrically to the first facet 41, attenuation or suppressing a primary reflection beam of a non-guided optical beam coming from the second end 8 and propagating in the substrate 10 towards the first waveguide end 7.

The optical block 40 is a rectangular parallelepiped in optical contact with the lower face 4 of the substrate at the primary reflection beam 13a and over a full interface 42 around this primary reflection point 13a. In this embodiment, the optical block 40 does not necessarily extend up to the side faces of the substrate 10. Advantageously, the optical block 40 extends along a direction transverse to the incidence plane. Alternatively, the optical block 40 extends parallel to the input face 1 from a side face of the substrate to the opposite side face of the substrate. According to particular aspects, the optical block 40 has, in the incidence plane, a rectangular section, a square section, a dovetail section, a polygonal section or a sphere-portion-shaped section.

FIG. 11 shows an IOC according to a variant of the invention in which the optical block 40 includes a first facet 41 inclined with respect to the upper face 3. Advantageously, the first facet 41 is a planar facet perpendicular to the incidence plane and inclined with respect to the upper face 3. Let's consider the non-guided optical beam 14a propagating from the first end 7 of the waveguide towards the primary reflection point 13a. The optical block 40 being in optical contact with the substrate 10 at the primary reflection point 13a, the non-guided optical beam 14a propagates until being incident on the first facet 41. Advantageously, the non-guided optical beam 14a is incident on the first facet 41 with an incidence angle equal to the Brewster angle $\theta_B$ for the material of the optical block 40 and at the wavelength of the non-guided optical beam 14a. That way, a part of the beam reflected on the first facet 41 is cancelled. Advantageously, the primary-reflection non-guided optical beam 14a is TM polarized. Placing the optical block with the facet 41 inclined at the Brewster angle cancels any reflection on the first facet 41. The non-guided optical beam 14a is entirely refracted to form a beam 19a propagating outside the integrated optical circuit.

Preferentially, the optical block 40 with the inclined facet 41 is made by optical adherence of a prism formed in the same material as the substrate 10 of the IOC. Advantageously, the optical block 40 includes a second inclined facet 43 arranged between the input face and the median plane 17. Still advantageously, the second facet 43 is symmetrical to the first facet 41 with respect to the median plane 17. The second facet 43 allows, symmetrically to the first facet 41, attenuating or suppressing the primary reflection of a non-guided optical beam coming from the second end 8 and propagating in non-guided way in the substrate 10 towards the first waveguide end 7.

The presence of a protruding optical block at the primary reflection point on the lower face of the substrate allows reducing drastically the intensity of the primary reflection at the second waveguide end on the output face. The invention thus makes it possible to considerably reduce the rate of spurious light transmitted by primary reflection on the lower face of an integrated optical circuit between a first and a second waveguide ends.

The invention makes it possible to reduce the transmission of spurious light coming from a non-guided optical beam reflecting by primary reflection on the lower face of an integrated optical circuit. In the case of an integrated optical circuit of the polarizer type formed by proton exchange on a lithium niobate substrate, the invention makes it possible to improve the extinction rate of the polarizer. The positioning of the optical block may be performed without expensive precision tooling. The invention is easy to implement and to realize, through optical adherence of an optical block similar to the substrate. Contrary to the grooves, the invention does no weaken an integrated optical circuit.

The invention advantageously applies to an integrated optical circuit comprising a plurality of optical waveguides, to reduce the rate of spurious coupling between a first end 7 of a first waveguide located on the input face of the IOC and another end 8 of another waveguide located on the output face of the IOC.

The invention claimed is:

1. An integrated optical circuit comprising:
   a substrate including an input face, an output face, a lower face, an upper face and two side faces, said lower face, upper face and side faces extending between the input face and the output face, the upper face being planar and opposite to the lower face;
   at least one optical waveguide located in a plane parallel to the upper face, said at least one optical waveguide extending between said input face and said output face;
   at least one first waveguide end located on the input face of the substrate and at least one second waveguide end located on the output face of the substrate;
   said integrated optical circuit being capable of receiving an incident optical beam on said first waveguide end, of forming a guided optical beam propagating in an optically guided manner, and of forming a non-guided optical beam propagating in a non-guided manner in the substrate, characterized in that, there being defined a median plane perpendicular to the upper face and to a line segment joining the first waveguide ends, said median plane passing through the middle of said line segment, an incidence plane perpendicular to the median plane, said incidence plane passing through the first end and the second end, and a primary reflection point located on the lower face at the intersection of the median plane and the incidence plane;
   the integrated optical circuit includes an optical block extending from the lower face to the outside of the substrate, arranged in the form of a part added on the lower face of the substrate, said optical block being positioned in the median plane and in the incidence plane and being in contact with said substrate at said primary reflection point and on a surface surrounding said primary reflection point, the lower face of the substrate comprising a first part that is planar and parallel to the upper face, said optical block forming a protrusion, at least at the primary reflection point, with respect to said first planar part of the lower face, and said optical block being capable of receiving and attenuating at least one non-guided optical beam propagating on the optical path of a primary reflection on said primary reflection point between said first waveguide end and said second waveguide end,
   wherein said optical block comprises at least one first facet arranged between the output face and said median plane, said at least one first facet being capable of receiving at least one non-guided optical beam propagating from the first end to said primary reflection point and/or at least one primary-reflection non-guided optical beam propagating from said primary reflection point to the second end, so as to attenuate said primary-reflection non-guided optical beam, and
   wherein, said substrate has a thickness $e_L$ between the planar part of the lower face and the upper face, said substrate has a length L between said input face and output face, and said at least one first facet is located at a distance D from said median plane that is higher than or equal to a minimum distance $D_{min}$, where $D_{min}$ is defined by the following equation:

$$D_{min} = \frac{L^2 \times \sqrt{\lambda/L}}{8 \times e_1}.$$

2. An integrated optical circuit according to claim 1, wherein said optical block is in optical contact with the lower face of said substrate on a surface surrounding said primary reflection point.

3. An integrated optical circuit according to claim 1, wherein said optical block is formed of a material whose refraction index is higher than or equal to 95% of the refraction index of the substrate.

4. An integrated optical circuit according to claim 3, wherein said optical block is formed of a same material as the substrate.

5. An integrated optical circuit according to claim 4, wherein, the substrate being formed of an oriented birefringent material, said optical block 404 is arranged on the lower face of the substrate following the same birefringence orientation as the substrate.

6. An integrated optical circuit according to claim 1, wherein the optical block has a depth $e_2$ higher than or equal to a minimum depth $e_{2min}$, such that:

$$e_{2min} = e_1 \times \frac{D}{(L/2 - D)}.$$

7. An integrated optical circuit according to claim 1, wherein said optical block includes at least one second facet arranged between the input face and said median plane, said at least one second facet being capable of receiving at least one non-guided optical beam propagating from the first end to a primary reflection point so as to attenuate said primary-reflection non-guided optical beam.

8. An integrated optical circuit according to claim 1, wherein said at least one first facet forms an angle equal to a Brewster angle with said at least one non-guided optical beam propagating from the first waveguide end to said primary reflection point.

9. An integrated optical circuit according to claim 1, wherein said optical block extends according to a direction parallel to the median plane.

10. An integrated optical circuit according to claim 1, wherein said planar substrate is a lithium niobate crystal, said at least one waveguide is a polarizer waveguide formed by proton exchange, said guided optical beam being of electric transverse polarization and said non-guided optical beam being of magnetic transverse polarization and wherein said optical block is formed of a lithium niobate crystal arranged with an orientation of the birefringence axes similar to that of said planar substrate.

11. An integrated optical circuit according to claim 2, wherein said optical block is formed of a material whose refraction index is higher than or equal to 95% of the refraction index of the substrate.

12. An integrated optical circuit comprising:
a substrate including an input face, an output face, a lower face, an upper face and two side faces, said lower face, upper face and side faces extending between the input face and the output face, the upper face being planar and opposite to the lower face;
at least one optical waveguide located in a plane parallel to the upper face, said at least one optical waveguide extending between said input face and said output face; at least one first waveguide end located on the input face of the substrate and at least one second waveguide end located on the output face of the substrate;
said integrated optical circuit being capable of receiving an incident optical beam on said first waveguide end, of forming a guided optical beam propagating in an optically guided manner, and of forming a non-guided optical beam propagating in a non-guided manner in the substrate, characterized in that, there being defined a median plane perpendicular to the upper face and to a line segment joining the first and the second waveguide ends, said median plane passing through the middle of said line segment, an incidence plane perpendicular to the median plane, said incidence plane passing through the first end and the second end, and a primary reflection point located on the lower face at the intersection of the median plane and the incidence plane;
the integrated optical circuit includes an optical block extending from the lower face to the outside of the substrate, arranged in the form of a part added on the lower face of the substrate, said optical block being positioned in the median plane and in the incidence plane and being in contact with said substrate at said primary reflection point and on a surface surrounding said primary reflection point, the lower face of the substrate comprising a first part that is planar and parallel to the upper face, said optical block forming a protrusion, at least at the primary reflection point, with respect to said first planar part of the lower face, and said optical block being capable of receiving and attenuating at least one non-guided optical beam propagating on the optical path of a primary reflection on said primary reflection point between said first waveguide end and said second waveguide end,
wherein said optical block is in optical contact with the lower face of said substrate on a surface surrounding said primary reflection point, and
wherein said optical block comprises at least one first facet inclined to the upper face and arranged between the output face and said median plane, said at least one first facet being capable of receiving at least one non-guided optical beam propagating from the first end to said primary reflection point and/or at least one primary-reflection non-guided optical beam propagating from said primary reflection point to the second end, so as to attenuate said primary-reflection non-guided optical beam.

13. An integrated optical circuit according to claim 1, wherein said optical block includes at least one second facet arranged between the input face and said median plane, said at least one second facet being capable of receiving at least one non-guided optical beam propagating from the first end to a primary reflection point so as to attenuate said primary-reflection non-guided optical beam.

14. An integrated optical circuit according to claim 6, wherein said optical block includes at least one second facet arranged between the input face and said median plane, said at least one second facet being capable of receiving at least one non-guided optical beam propagating from the first end to a primary reflection point so as to attenuate said primary-reflection non-guided optical beam.

15. An integrated optical circuit according to claim 1, wherein said at least one first facet forms an angle equal to a Brewster angle with said at least one non-guided optical beam propagating from the first waveguide end to said primary reflection point.

16. An integrated optical circuit according to claim 6, wherein said at least one first facet forms an angle equal to a Brewster angle with said at least one non-guided optical beam propagating from the first waveguide end to said primary reflection point.

* * * * *